US011164272B2

(12) United States Patent
Anderson

(10) Patent No.: US 11,164,272 B2
(45) Date of Patent: Nov. 2, 2021

(54) MAIL CARRIER TRAINING METHOD

(71) Applicant: Tanner Michael Anderson, Cushing, MN (US)

(72) Inventor: Tanner Michael Anderson, Cushing, MN (US)

( * ) Notice: Subject to any disclaimer, the term of this patent is extended or adjusted under 35 U.S.C. 154(b) by 178 days.

(21) Appl. No.: 15/893,301

(22) Filed: Feb. 9, 2018

(65) Prior Publication Data

US 2018/0232838 A1    Aug. 16, 2018

Related U.S. Application Data

(60) Provisional application No. 62/584,908, filed on Nov. 12, 2017, provisional application No. 62/457,902, filed on Feb. 12, 2017.

(51) Int. Cl.
*G06Q 50/28* (2012.01)
*G06Q 10/06* (2012.01)
*G06K 9/22* (2006.01)
*G08B 3/10* (2006.01)

(52) U.S. Cl.
CPC .......... *G06Q 50/28* (2013.01); *G06K 9/228* (2013.01); *G06Q 10/06316* (2013.01); *G06K 2209/01* (2013.01); *G08B 3/10* (2013.01)

(58) Field of Classification Search
None
See application file for complete search history.

(56) References Cited

U.S. PATENT DOCUMENTS

| 4,991,914 | A | * | 2/1991 | Kerstein | B07C 1/025 211/10 |
|---|---|---|---|---|---|
| 6,246,925 | B1 | | 6/2001 | Robinson et al. | |
| 9,646,369 | B2 | | 5/2017 | Salzman et al. | |
| 9,658,310 | B2 | | 5/2017 | Loverich et al. | |
| 2003/0038065 | A1 | * | 2/2003 | Pippin | B65H 29/14 209/584 |
| 2004/0230543 | A1 | | 11/2004 | Baker et al. | |
| 2005/0119786 | A1 | | 6/2005 | Kadaba | |
| 2008/0027986 | A1 | | 1/2008 | Stemmle | |
| 2010/0033328 | A1 | * | 2/2010 | Moses | A47G 29/1214 340/569 |
| 2014/0180959 | A1 | * | 6/2014 | Gillen | G06Q 10/0833 705/341 |
| 2014/0278998 | A1 | * | 9/2014 | Systrom | G06Q 30/0277 705/14.57 |
| 2015/0066368 | A1 | * | 3/2015 | Mckenzie | G01C 21/3676 701/538 |

FOREIGN PATENT DOCUMENTS

WO    WO-2011161478 A1 * 12/2011  .......... G06Q 10/087

* cited by examiner

*Primary Examiner* — Akosua Kyereme-Tuah
(74) *Attorney, Agent, or Firm* — Merchant & Gould P.C.

(57) ABSTRACT

Described herein is a method and system for sorting and delivering postal items. The method includes overlaying a grid onto a sorting area; the grid system includes rows and columns of cells. A set of coordinates is used to indicate to the carrier where an address associated with a piece of mail is located in the sorting area. The method also includes guiding a carrier along the route and indicating to the carrier where mail associated with the address has been sorted.

16 Claims, 13 Drawing Sheets

MAIL CARRIER TRAINING METHOD

CROSS-REFERENCE TO RELATED APPLICATIONS

This application claims priority to U.S. Application No. 62/457,902, titled "Mail Carriers Training Assistant," filed Feb. 12, 2017, and to U.S. Application No. 62/584,908, titled "Mail Carriers Training Assistant," filed Nov. 12, 2017, both of which are hereby incorporated by reference in their entireties.

BACKGROUND

The United States Postal Service (USPS) delivers millions of letters and packages every day to millions of delivery points nationwide, which amounts to almost half the world's mail. Mail is first sorted at a high level, such as by zip code, before being sorting by route and then by address. There are more than 200,000 carriers that deliver to more than 100 million addresses daily. Before delivery, each carrier must sort and prepare parcels before delivery. Carriers sort flat mail items, small packages, and large packages. This process may be relatively quick for a carrier with a regular route; however, this process may take a lot longer for a temporary worker or someone unfamiliar with the route.

For every route, a postal carrier sorts and delivers mail for up to 200-400 unique addresses. The sorting process can take up to 3 hours for a carrier with a regular route. A temporary carrier may train for up to 3 days, and even then, the process can take up to 5 hours, which is a substantial increase in the amount of time just to sort the route's daily mail.

Accordingly, there exists a need to streamline the sorting process at the address level that makes it quicker and easier for a carrier to sort and deliver mail.

SUMMARY

In summary, the present disclosure relates to a computer-implemented method and system for sorting and delivering postal items. In particular, a grid system is overlaid on a sorting area to indicate to a carrier where mail belongs during the sorting process. The grid system provides a means to decrease the time it takes a user to sort the mail.

In a first aspect, a computer-implemented method for sorting and delivering postal items. The method includes prompting a user to input a picture of a sorting area, wherein the sorting area comprises multiple spaces and each space is associated with a single address. A grid system is virtually overlaid onto the sorting area, where the grid system comprises rows and columns of cells. Each of the cells has a location defined by a set of coordinates, and with each of the cells correspond to at least one of the multiple spaces of the sorting area. An address is received and is associated with a piece of mail, and wherein the address is located in the sorting area is indicated using the set of coordinates.

In another aspect, a computer-implemented system for sorting and delivering postal items comprises at least one processor and a memory encoding instructions that, when executed by the processor, cause the processor to take the following steps: prompt a user to input a picture of a sorting area, wherein the sorting area comprises multiple spaces, each space being associated with a single address; overlaying a grid system onto the sorting area, wherein the grid system comprises rows and columns of cells, with each of the cells having a location defined by a set of coordinates; receive an address associated with a piece of mail; and indicate where the address is located within the set of coordinates is associated.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

DETAILED DESCRIPTION OF THE FIGURES

Figure 1:
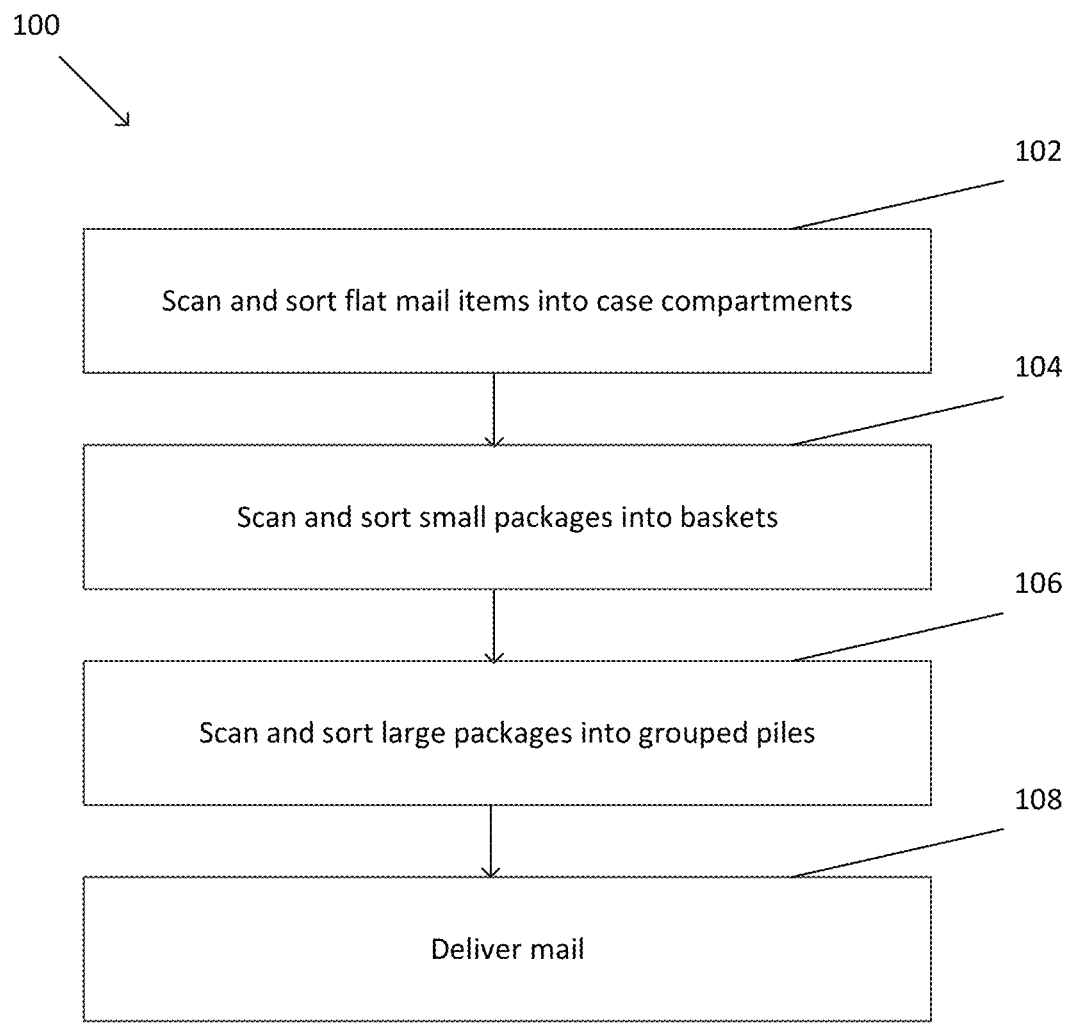
FIG. 1 illustrates an example embodiment of a method of sorting and delivering mail.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

In general, the present disclosure is directed towards a system for managing the process of sorting and delivering mail.

The process of sorting parcels includes, at minimum, sorting flat parcels into compartments, sorting small packages, and sorting large packages. Carriers are responsible for sorting their own mail for each address on the route. This process generally requires the carrier to know the order of addresses on the route and to know where the addresses are located in a sorting case or sorting area. If the carrier does not know the route well or is working on a new route, a lot of time is wasted searching for where mail belongs in a sorting case or sorting area. Additionally, it may take additional time for carrier to complete delivering mail to the addresses.

FIG. 1 illustrates a basic method of scanning, sorting, and delivering mail 100. This process generally takes place each day by each individual carrier. Each carrier is responsible for one route and generally sorts and delivers mail for 200-400 unique addresses.

At step 102, flat mail items may be scanned and sorted into case compartments. Flat mail items include letters, magazines, catalogs, and similar items. A sorting case is utilized, which contains multiple compartments, and each case compartment has been assigned a single address. The addresses are ordered in the same order as the address order of the route. If a carrier does not know where the address is located in the sorting case, the carrier is able to manually scan each piece of mail. After scanning the piece of mail, the program shows the carrier where the appropriate compartment is located.

At step 104, small packages are scanned and sorted into baskets. Small packages include bags and small boxes, which are generally small enough to fit into a standard mailbox. Small packages are sorted into a different area than flat mail, due to their size. All of the addresses on the route are separated into groups, where each group represents multiple addresses. Each basket or partial basket represents one group. Small packages are sorted into their respective group. If a carrier does not know which group the address is assigned to, the carrier is able to manually scan each small package. After scanning the small package, the program shows the carrier to which group the address belongs.

Optionally, the program indicates to the carrier that a flag or other marker needs to be added to the flat mail compartment. This flag or other marker notifies the carrier while on the route that a small package, located in a different area in the delivery vehicle, needs to be delivered to the address.

At step 106, large packages are scanned and sorted into groups. Large packages include mail items that are generally too large to fit into a standard mailbox. All of the addresses on the route are separated into groups, where each group represents multiple addresses. In an example sorting method, large packages are sorted on the floor before being placed on a cart. Large packages are sorted into their respective group. If a carrier does not know which group the address is assigned to, the carrier is able to manually scan each large package. After scanning the large package, the program shows the carrier to which group the address belongs.

Finally, at step 108, the mail items are delivered to their respective address. The carrier delivers flat mail items and small packages into mailboxes. Large packages are generally delivered elsewhere, such as a doorstep, or receiving office.

Optionally, the program indicates to the carrier that a flag or other marker needs to be added to the flat mail compartment. This flag or other marker notifies the carrier while on the route that a large package, located in a different area in the delivery vehicle, needs to be delivered to the address.

Figure 2:
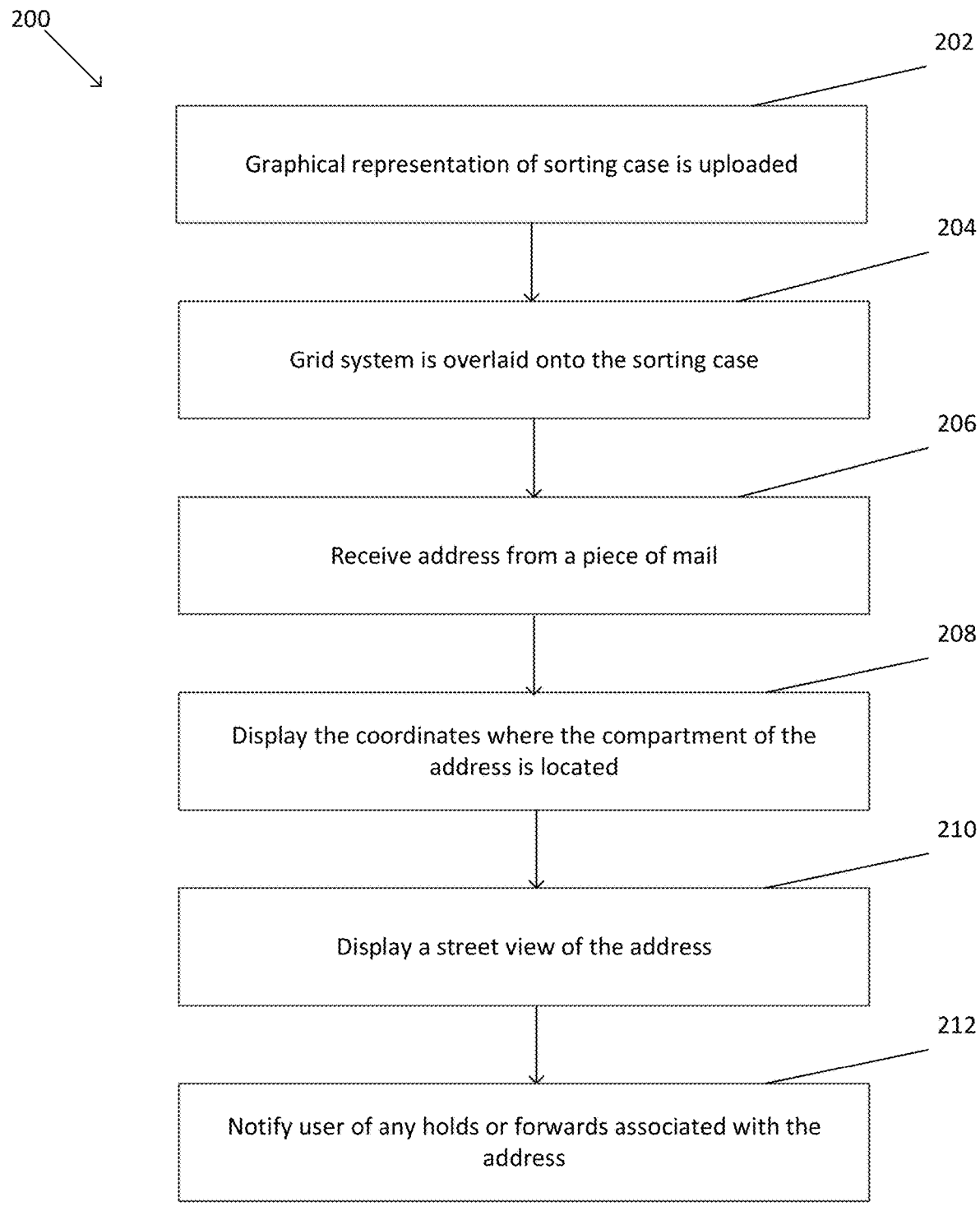
FIG. 2 illustrates an example embodiment of a method to sort flat mail.

FIG. 2 illustrates a more detailed method of sorting flat mail items 200.

Figure 5:
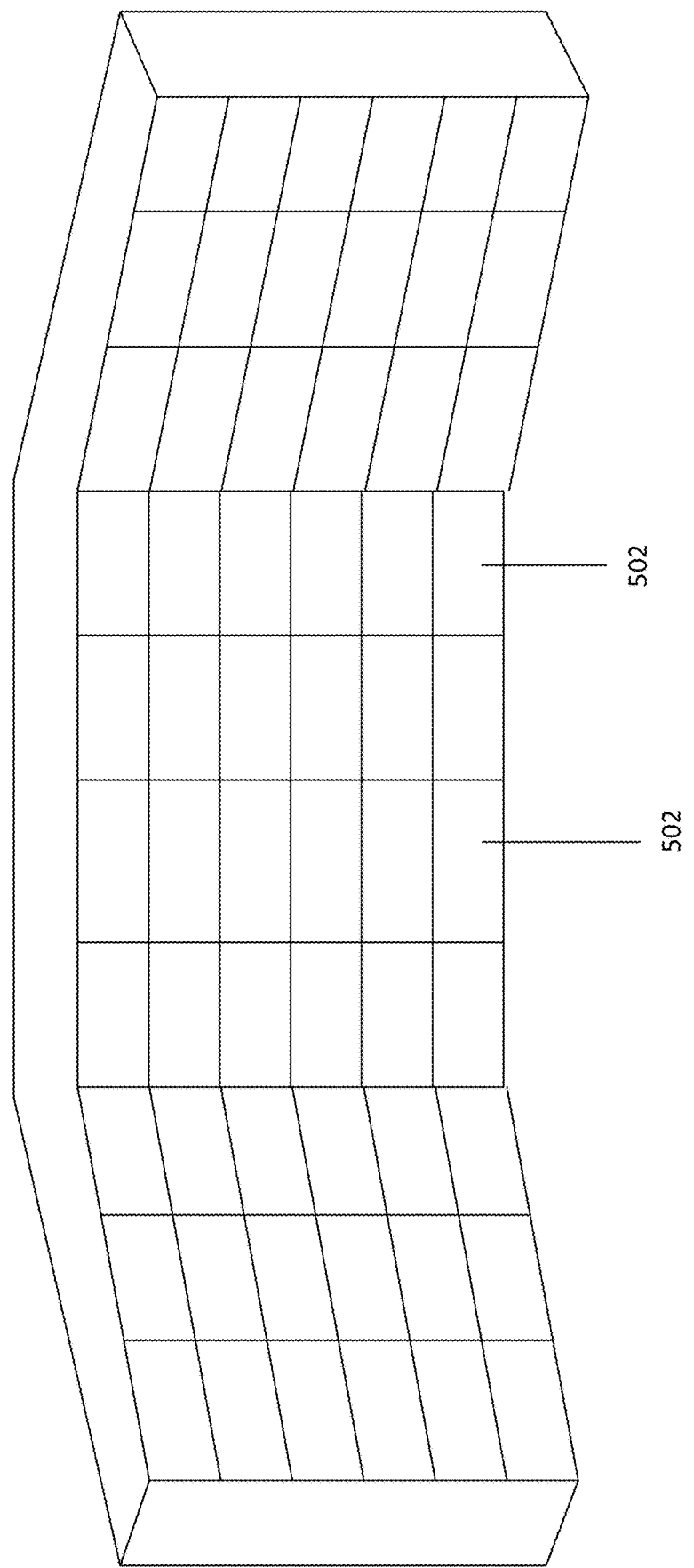
FIG. 5 illustrates an example case compartment for sorting flat mail.

At step 202, the carrier inputs a graphical representation, for example a picture, of the physical sorting area, such as a sorting case. In traditional mail sorting systems, as shown in FIG. 5, a sorting case with dividers is used to sort postal items based on the address. Each compartment in the case represents one unique address. The case may be as large or as small as needed, so that every address on a route is represented by a compartment. In an example, more than one case may be needed if the route has a large number of addresses.

Once a graphical representation is uploaded, the program overlays a grid system onto the picture of the sorting area 204. The grid system is comprised of multiple rows and columns of cells. Each cell has a location that is defined by a set of coordinates. In a first example, each compartment, which represents one address, is assigned to a cell. In another example, each cell may comprise more than one compartment, each compartment representing one address. The addresses are organized in sequential order, the order in which the carrier delivers the mail. After the graphical representation is uploaded and addresses are assigned, the program saves this information for later use. The carrier does not need to upload a graphical representation of the sorting case each day unless the route has been changed. Further, if a temporary carrier is managing the route, they are able to access the previously uploaded graphical representation of the sorting case.

At step 206, flat mail is scanned and sorted into the sorting case compartments. The carrier indicates to the sorting program that addresses will be scanned or inputted into the sorting program for sorting. The carrier scans each piece of mail with a reading device. A reader device can include a computing device, smartphone, tablet, watch, wearable device, or any other type of device capable of reading the barcode and/or preforming OCR of the address. For purposes of this application, a reading device will be referred to as a mobile computing device. Scanning the piece of mail inputs that piece of mail into the sorting program. In an example, the sorting program is also connected to the USPS tracking program, which utilizes the tracking number printed on each piece of mail.

There are multiple different ways that the sorting program can receive the address of pieces of mail and packages. A first method includes utilizing a barcode. Processed letters, magazines, and parcels receive an Intelligent Mail Barcode ("IMB"), which is a 65-bar barcode used by the United States Postal Service. An IMB is associated with a 20 digit tracking code and a Routing Code that can be read by reading program. A carrier can use a mobile computing device with a reading program to scan the IMB and sort letters, magazines, and parcels accordingly.

Another method of inputting addresses into the sorting program includes using an Optical Character Recognition (OCR) program. An OCR program can read typed or handwritten addresses on the piece of mail. A carrier takes a picture of the address, which is deciphered by the OCR program. Once the address is deciphered, it is uploaded to the sorting program.

Yet another method of inputting addresses into the sorting program includes manually entering the address information. For example, a carrier may use a keyboard or voice recognition software to input the address into the sorting program. If the sorting program does not recognize the address using an OCR program, then the carrier manually types the address into the sorting program. If the carrier is using a voice recognition software, the user may first say a "hot word" that activates the address input part of the program, and then states the address.

Figure 6:
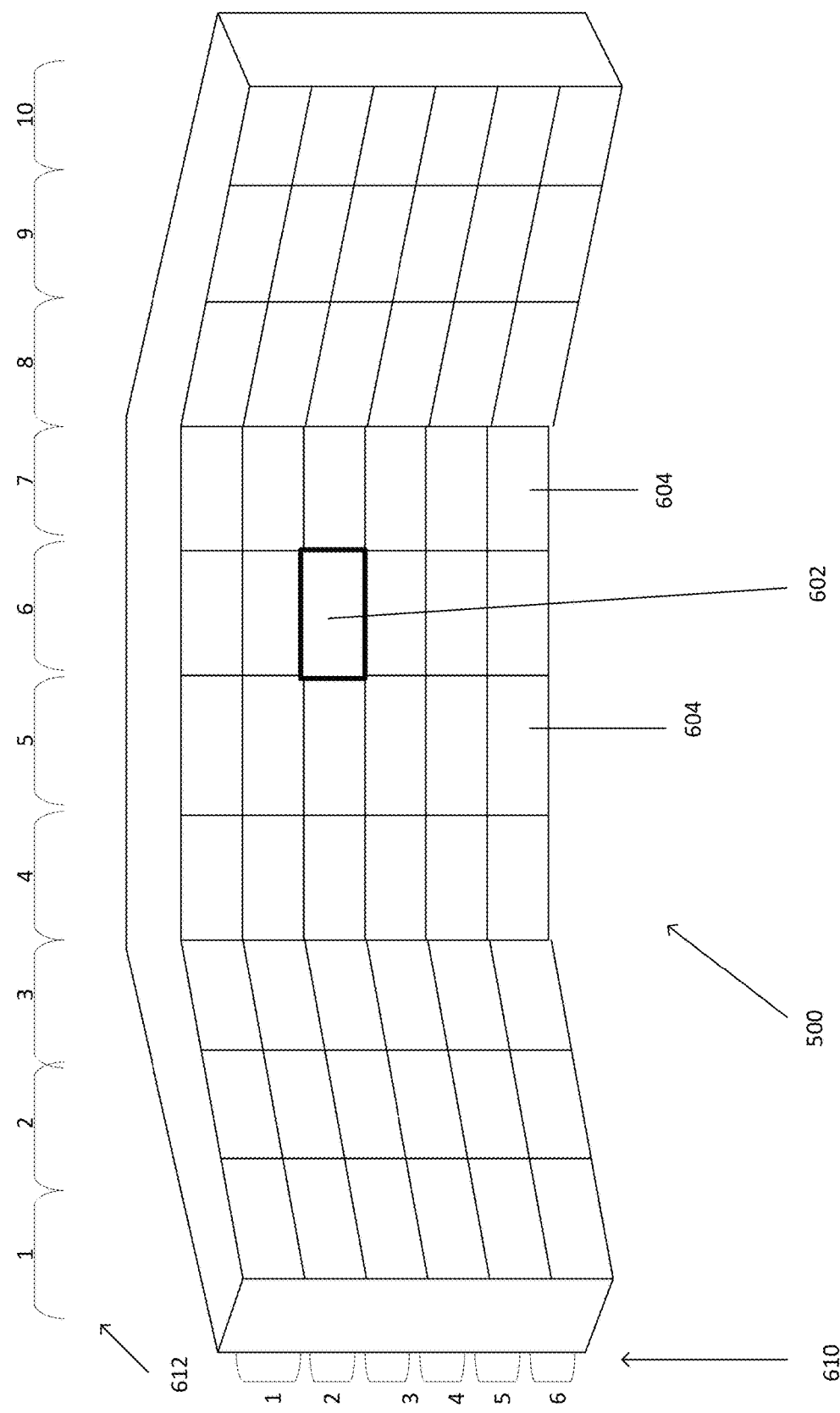
FIG. 6 illustrates an example layout of a screen of the computing device for sorting flat mail.
Figure 7:
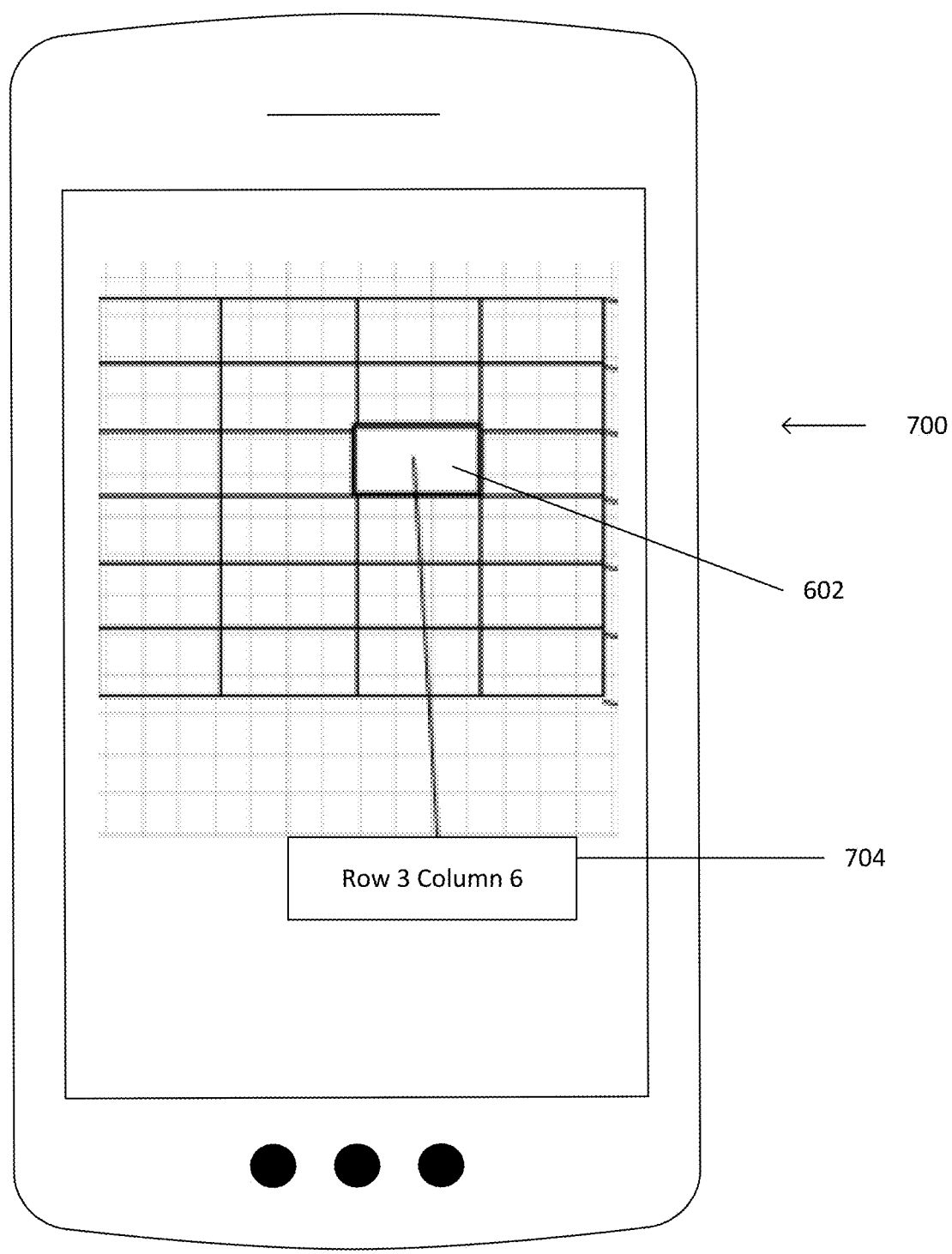
FIG. 7 illustrates an example embodiment of a labeled case compartment for sorting flat mail.

At step 208, when the carrier scans or otherwise inputs the address of the mail item into the sorting program, the sorting program identifies the set of coordinates of the cell where the address compartment is located. The program may identify the cell with a numeral representation, for example, "row A, column 3." The sorting program may also identify the cell with a graphical representation, for example, as shown in FIGS. 6-7. The correct cell is highlighted by the sorting program, to indicate to the user which cell is the correct one. The sorting program is able to quickly identify where the address compartment is located using the coordinate system.

When the program reads an address associated with an individual piece of mail it directs the user to where the appropriate compartment is located. This allows a user to quickly identify which compartment the individual piece of mail belongs during the sorting process. Additionally, the sorting program helps the carrier to memorize where the addresses are located in the sorting cases, as well as the route order.

At optional step 210, the program may also associate the compartment with a street view of the actual address location. In an example, when the mail is being sorted, the compartment is highlighted and the physical location of the address is also shown on the screen.

Finally, at optional step 212, when a carrier scans a piece of mail, the sorting program may alert the carrier as to any special instructions associated with that address. For example, a special instruction may be that mail is on hold for that address, or that the mail for that address is being forwarded to a different address. If mail is on hold for that address, the carrier does not deliver that mail, so the carrier knows to leave the mail pieces in the case compartment and not to deliver them. If the mail is being forwarded to a different address, the program can alert the carrier where the new address is located in the case compartment, or if the address is on a different route. Still further, a special instruction may be that a package is also to be delivered at the address.

Figure 3:
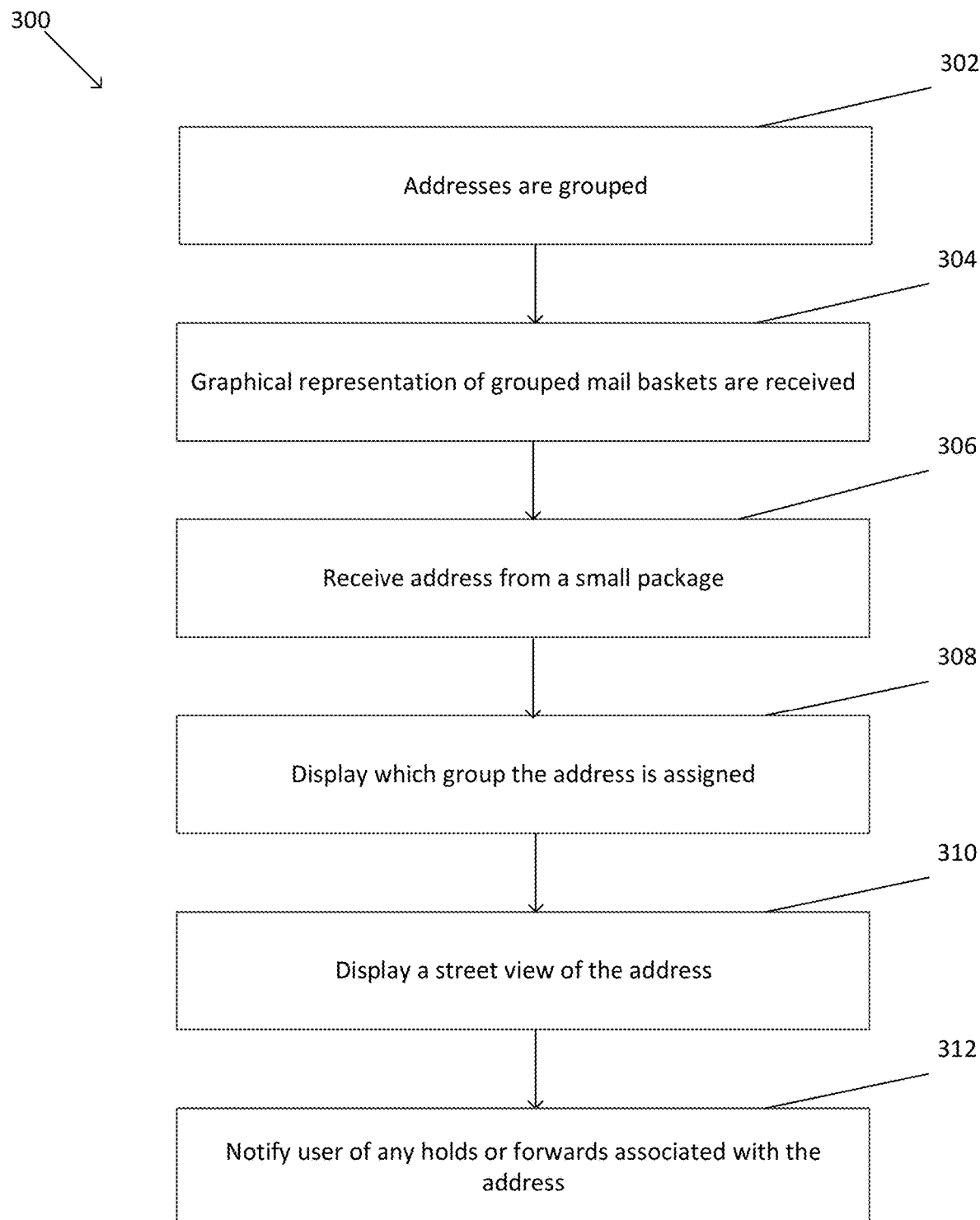
FIG. 3 illustrates an example embodiment of a method to sort small packages.

FIG. 3 illustrates an example method of sorting small packages 300. First, the addresses from the route are separated into groups 302. In an example, the program may divide the route's address into four groups. Each group represents an equal amount of addresses from the route. Depending on the amount of addresses, more or less than four groups may be needed to separate the addresses into manageable groups. During holidays, there is an increase in package delivery, so there may be a larger number of groups to accommodate all the packages.

Figure 8:
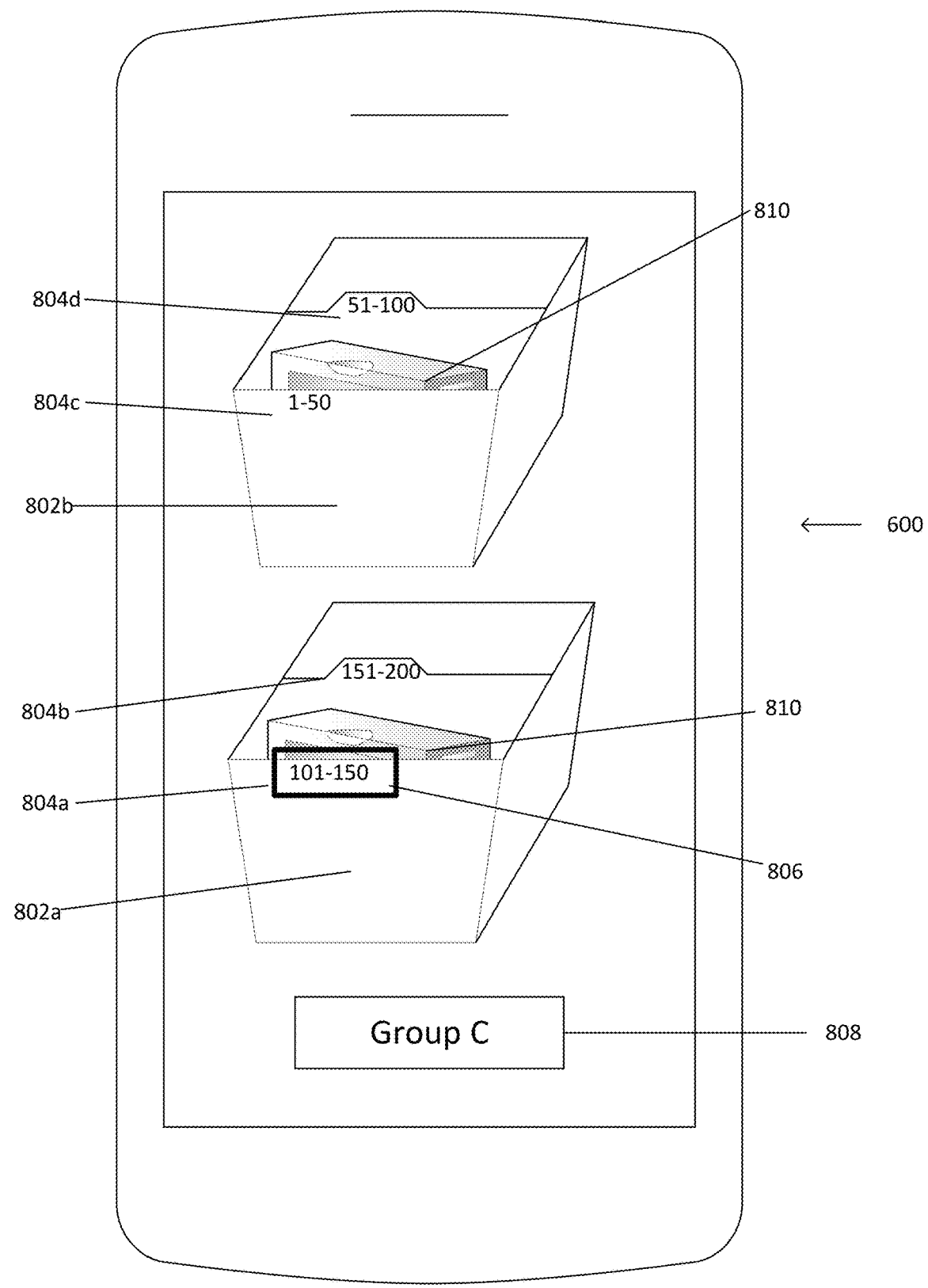
FIG. 8 illustrates an example layout of a screen of the computing device for sorting small packages.

At step 304, the user must input a graphical representation, for example a picture, of the physical sorting area. In traditional mail sorting systems, as shown in FIG. 8, multiple baskets are used to hold the small packages. Each basket or portion of the basket represents one group. In an example, multiple baskets may be needed for a single group if the route has a large number of addresses or there are many small packages to be delivered.

Once a graphical representation is uploaded, the sorting program assigns a group to each basket or basket portion. The addresses in the groups are organized in a sequential order, the order in which the carrier delivers the mail. After the graphical representation is uploaded and addresses are assigned, the program saves this information for later use. The carrier does not need to upload a graphical representation of the sorting baskets each day unless the route has been changed. Further, if a temporary carrier is managing the route, they are able to access the previously uploaded graphical representation of the sorting baskets.

At step 306, addresses of the small packages are received by the sorting program. The carrier indicates to the sorting program that addresses will be scanned or inputted into the sorting program for sorting. The carrier scans each small package with a mobile computing device. As described above, addresses may be received through scanning of an IMB, using OCR, or having the carrier type the address into the sorting program.

Once the address of a small package is received, the sorting program flags that the address also includes a small package to be delivered. When the carrier is delivering mail along the route and arrives at that address, the sorting program alerts the carrier that a small package needs to be delivered.

In another embodiment, if packages are being delivered on a non-traditional delivery day, the program customizes a route that only includes the addresses of the packages to be delivered.

At step 308, when the user scans or otherwise inputs the small package into the sorting program, the sorting program identifies which basket is assigned to the address. The sorting program may identify the group with a numeral representation, for example, "Group A." The program may also identify the group basket with a graphical representation, for example, as shown in FIG. 8. The correct basket is highlighted by the program, to indicate to the user which basket is the correct one (FIG. 8). The program is able to quickly identify which basket the small package belongs.

When the program reads an address associated with a small package, the sorting program directs the carrier to the associated basket. This allows a user to quickly identify which basket and/or group, the small package belongs during the sorting process. Additionally, the sorting program helps the carrier to memorize where the addresses are located in the groups, as well as the route order.

At optional step 310, the program may also associate the compartment with a street view of the actual address location. In an example, when the mail is being sorted, the compartment is highlighted and the physical location of the address is also shown in the screen.

Finally, at optional step 312, when a user scans a piece of mail the program may alert the user to any special instructions associated with that address. For example, a special instruction may be that mail is on hold for that address, or that the mail for that address is being forwarded to a different address.

Figure 4:
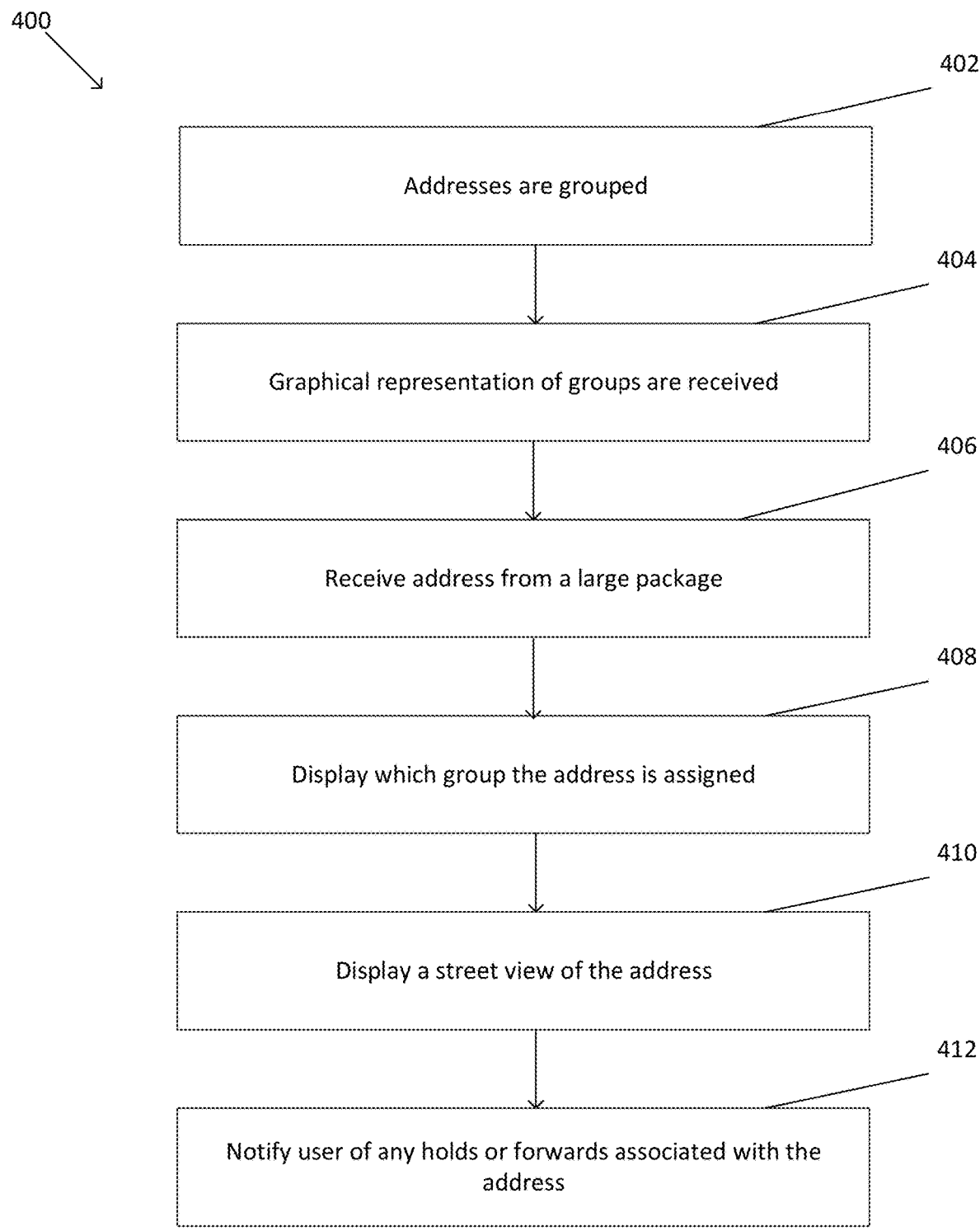
FIG. 4 illustrates an example embodiment of a method to sort large packages.

FIG. 4 illustrates an example method of sorting large packages 400. First, the addresses from the route are separated into groups 402. In an example, the program may divide the route's address into four groups. Each group represents an equal amount of addresses from the route. Depending on the amount of addresses, more or less than four groups may be needed to separate the addresses into manageable groups.

Figure 9:
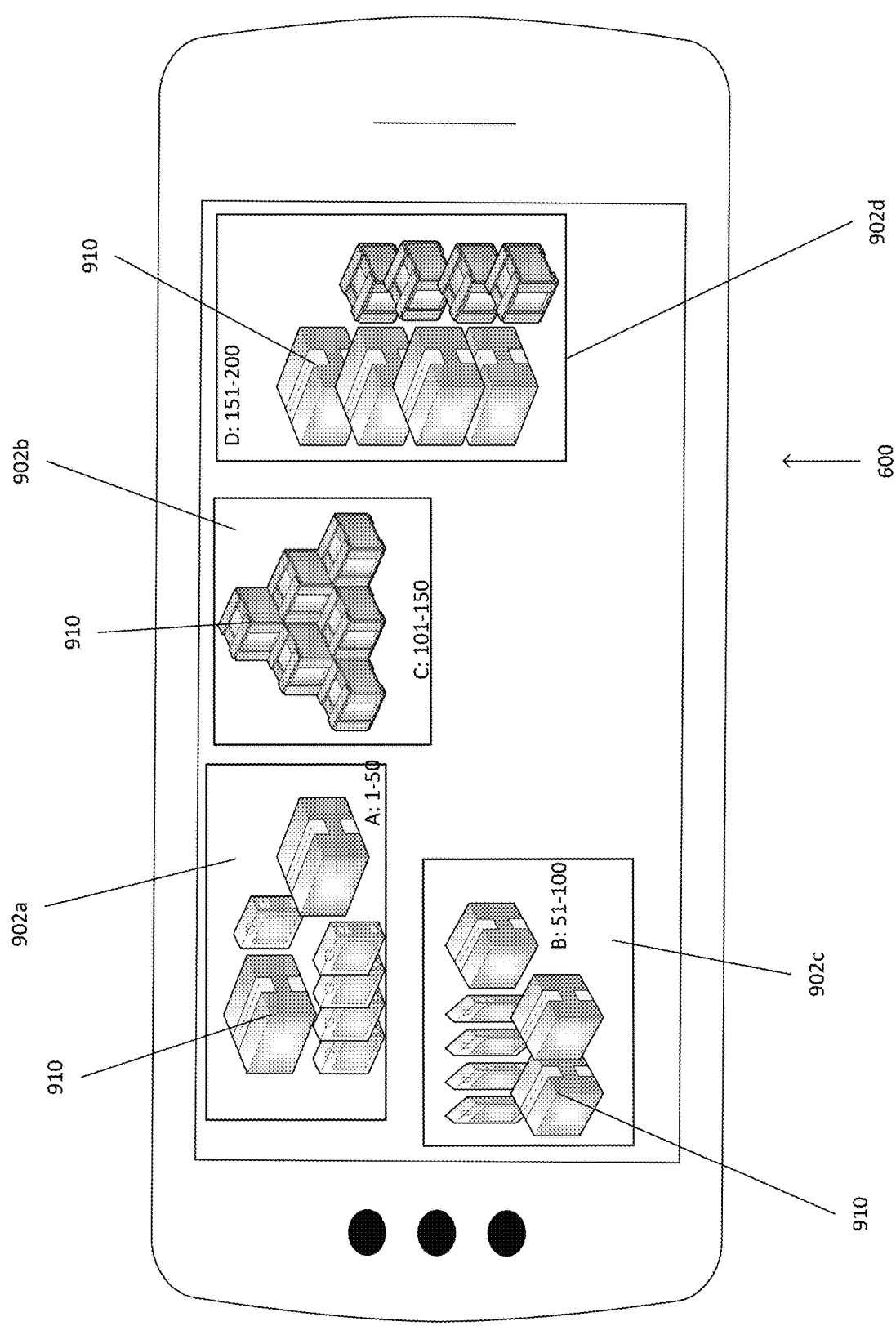
FIG. 9 illustrates an example layout of a screen of the computing device for sorting large packages.

At step 404, the user must input a graphical representation, for example a picture, of the physical sorting area. In traditional mail sorting systems, as shown in FIG. 9, large packages may be sorted on a floor before being moved onto a cart for transport into a delivery vehicle. Each area on the floor represents one group.

Once a graphical representation is uploaded, the sorting program assigns a group to each floor area or area on a cart. The addresses in the groups are organized in a sequential order, the order in which the carrier delivers the mail. After the graphical representation is uploaded and addresses are assigned, the program saves this information for later use. The carrier does not need to upload a graphical representation of the sorting baskets each day unless the route has been changed. Further, if a temporary carrier is managing the route, they are able to access the previously uploaded graphical representation of the sorting baskets.

At step 406, addresses of the large packages are received by the sorting program. The carrier indicates to the sorting program that addresses will be scanned or inputted into the sorting program for sorting. The carrier scans each large package with a mobile computing device. As described above, addresses may be received through scanning of an IMB, using OCR, or having the address manually inputted.

Once the address of a large package is received, the sorting program flags that the address also includes a large package to be delivered. When the carrier is delivering mail along the route and arrives at that address, the sorting program alerts the carrier that a large package needs to be delivered. The sorting program can also indicate to the carrier where the large package is located in the delivery vehicle and/or cart.

Figure 10:
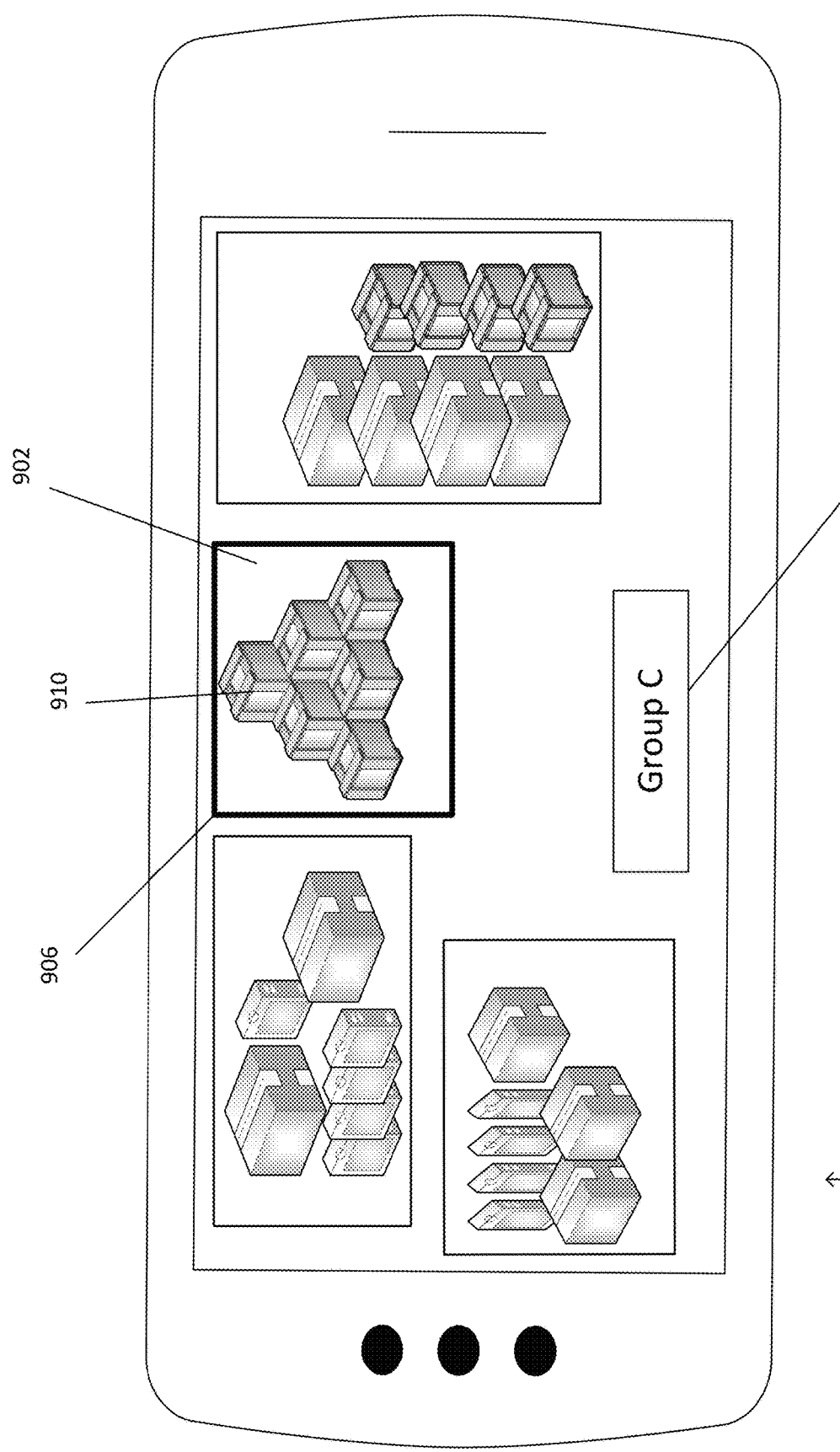
FIG. 10 illustrates an example layout of a screen of the computing device indicating a grouping of large packages.

At step 408, when the user scans or otherwise inputs the large package into the sorting program, the sorting program identifies which floor area or cart area is assigned to the address. The sorting program may identify the group with a numeral representation, for example, "Group A." The sorting program may also identify the floor area with a graphical representation, for example, as shown in FIG. 9. The floor area is highlighted by the program, to indicate to the user which basket is the correct one (FIG. 10). The program is able to quickly identify where the large package belongs.

When the program reads an address associated with a large package, the sorting program directs the carrier to the associated floor area. This allows a user to quickly identify where the large package belongs during the sorting process.

At optional step 410, the program may also associate the group or address with a street view of the actual address location. In an example, when the large packages are being sorted, the area of the floor is highlighted and the physical location of the address is also shown in the screen.

Finally, at optional step 412, when a user scans a large package the program may alert the user to any special instructions associated with that address. For example, a special instruction may be that mail is on hold for that address, or that the mail for that address is being forwarded to a different address.

FIG. 5 illustrates an example embodiment of the sorting case 500 used for sorting flat pieces of mail. Sorting case 500 includes multiple compartments 502. Each compartment 502 is assigned a single address. The carrier takes a picture of the sorting case 500, which is uploaded to the sorting program. Each compartment may be the same size, or each compartment may be sized as needed. For example, a business address may have a large compartment, while a personal address may have a small compartment.

As shown in FIG. 6, the compartments shown on the mobile computing device correspond to the actual sorting case 500. However, this is not always how the grid system is overlaid onto the sorting case. In some instances, multiple compartments may fit into each cell. Sorting case 500 includes multiple rows 610 and multiple columns 612, which program uses to assign a value to each cell. As shown, the top row is assigned row "1" and each subsequent row is assigned a higher numerical value. The left-most column is assigned column "1" and each subsequent row is assigned a higher numerical value. However, various numbering systems may be used. For example, letters, colors, or shapes may be used as a coordinate system to identify cells. Characters used in other languages may also be used. Each row 610 and column 612 combination represents an individual cell 604. As shown in FIG. 6, each individual cell 604 also represents an individual compartment. The sorting program then assigns addresses to the compartments 502 in the order of the route and notes which address is assigned to which set of coordinates.

When a carrier scans a piece of mail, the program indicates in which cell the address is located. The cell 604 is highlighted 602, so the carrier knows where the correct compartment 502 is located in the sorting area. Once the carrier scans a new piece of mail, the next correct cell is highlighted 602.

FIG. 7 illustrates a mobile computing device 700 used to help scan, sort, and deliver mail. After a carrier scans a piece of mail, the sorting program highlights which cell 604 is associated with the address on the piece of mail. The highlighted cell 602 indicates to the carrier where the piece of mail should be placed. The sorting program also may show text 704 that indicates to the carrier which compartment is being highlighted. For example, the program indicates that the highlighted compartment is "Row 3, Column 6." The sorting program may also include an auditory notification to indicate the highlighted compartment, so the carrier does not need to look at the screen to know which the correct compartment is.

If multiple sorting cases are used, an additional identifier may be used to indicate to the carrier where the address contents are located. For example, the program indicates that the highlighted compartment is "Case B, Row 3, Column 6." In an example, cases may be assigned a color, so the carrier can more quickly associate the location of the compartment with the case.

FIG. 8 illustrates an example embodiment of mobile device 600 highlighting which group to sort small packages 810 into. In an example, two baskets 802 are used to sort small packages 810. Each basket 802a, 802b comprises two dividers 804a, 804b, 804c, 804d. Each divider 804a, 804b, 804c, 804d represents one-fourth of the addresses on the route. More or less than four dividers 804 may be used, depending on the number of small packages to be delivered. When a small package 810 is scanned, the associated divider 804 is highlighted 806, which illustrates to the carrier where the small package 806 belongs. The program also may show text 808 that indicates to the user which compartment is being highlighted. For example, the program indicates that the highlighted compartment is "Group C." The sorting program may also include an auditory notification to indicate the highlighted compartment, so the carrier does not need to look at the screen to know which the correct compartment is.

However, various numbering systems may be used. For example, letters, colors, or shapes may be used as a coordinate system to identify cells. Characters used in other languages may also be used.

FIG. 9 illustrates an example embodiment of mobile device 600 showing the grouping 902 of large packages 910. In an example, four areas 902a, 902b, 902c, 902d, are used to sort large packages 910. Each area 902 represents one-fourth of the addresses on the route. More of less than four areas 902 may be used, depending on the number of large packages to be delivered.

When a large package 910 is scanned, the associated area 902 is highlighted 906, as shown in FIG. 10. The highlighted area 906 indicates to the user where the large package 910 belongs. The program may also show text 908 that indicates to the user which area is being highlighted. For example, the program indicates that the highlighted area is "Group C." The sorting program may also include an auditory notification to indicate the highlighted compartment, so the carrier does not need to look at the screen to know which the correct compartment is.

However, various numbering systems may be used. For example, letters, colors, or shapes may be used as a coordinate system to identify cells. Characters used in other languages may also be used.

Figure 11:
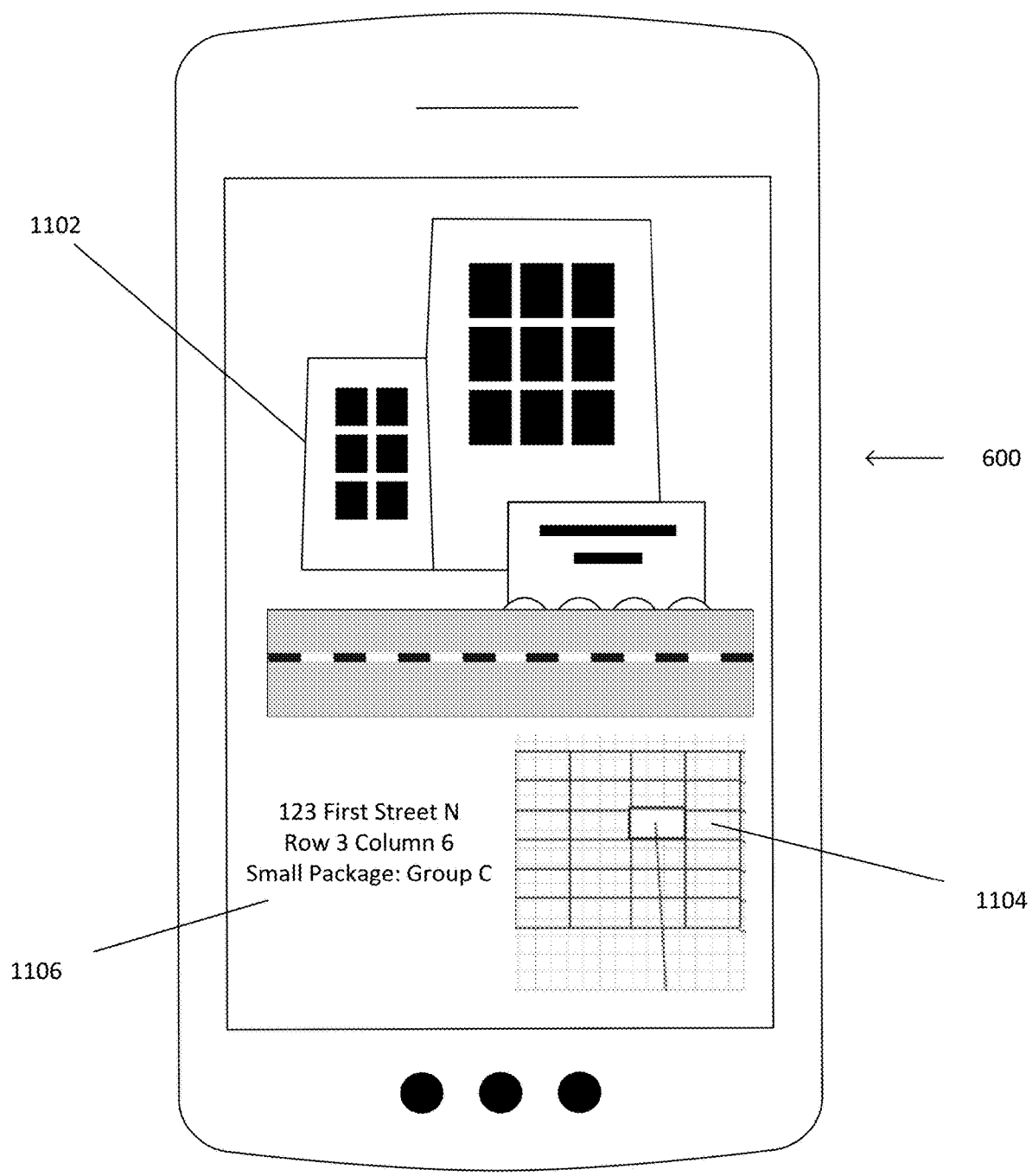
FIG. 11 illustrates an example layout of a screen of a delivery address.

FIG. 11 illustrates an example embodiment of a screen shot of an address while delivering mail along the route. The mobile device 600 shows a street view 1102 of the address, a view of the highlighted compartment 1104, and associated text 1106.

As an initial input, all the addresses on the route are uploaded into the sorting program. The sorting program prepares a route and orders the addresses sequentially for sorting to occur.

The street view 1102 may work in connection with a map program, such as GoogleMaps®, Waze®, or other map program. Alternatively, the program may have its own map program. In a first embodiment, the addresses of the route are inputted before the sorting process occurs, so every address is included regardless of whether or not there is mail to be delivered at that address. In another embodiment, when the mail is sorted, the addresses are inputted into a mapping engine as destination points. A route guidance engine directs the user along the route and indicates to the user where to stop. The route guidance engine can also alert the user if mail is on hold at an address and should not be delivered, or if mail is being forwarded to or from an address.

In yet a further embodiment, the last name associated with the address can be provided to the carrier. The carrier can check the address given by the sorting program with the last name(s) on the mailbox as a check to make sure the mail is being addressed to the correct person and/or the correct mail is being delivered to the correct person.

The associated text 1106 can include the address, the location of the mail in the case compartment, and additional notifications. For example, an additional notification may include that a small package is to be delivered at the address. The associated text states "Small Package: Group C," which indicates to the user where the small package is located. In an embodiment, if a large package is to be delivered, the associated text would indicate to the user where the large package is located.

In an embodiment, if a large package is to be delivered, a picture of the large package may be shown on the screen in addition to the associated text. This would help the user more quickly find the large package.

Figure 12:
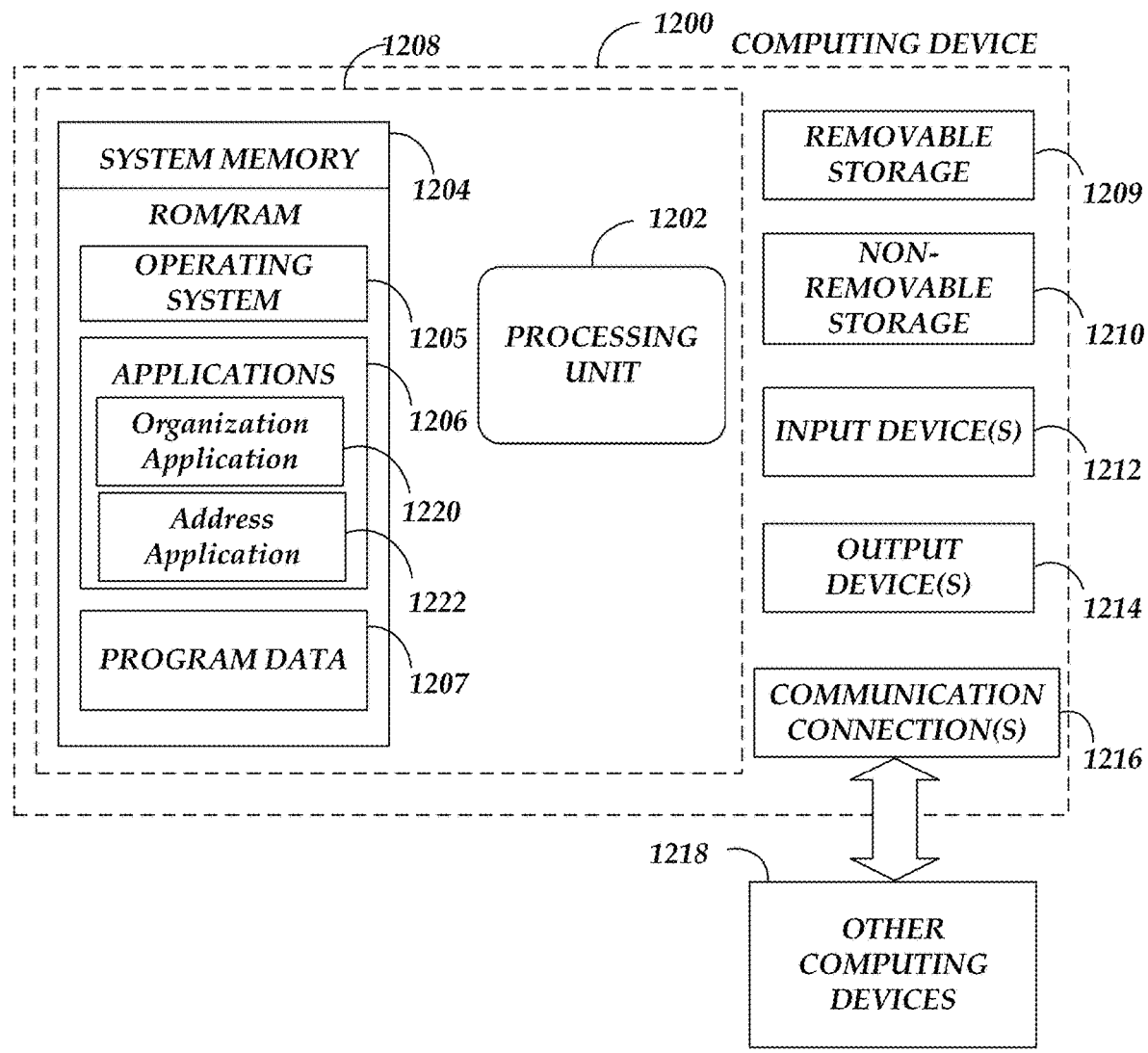
FIG. 12 is a block diagram illustrating one example of the physical components of a computing device.

With reference to FIG. 12, one exemplary system includes a computing device, such as computing device 1200. In a basic configuration, computing device 1200 may include at least one processing unit 1202 and a system memory 1204. Depending on the configuration and type of computing device, system memory 1204 may be volatile (such as RAM), non-volatile (such as ROM, flash memory, etc.), or some combination. System memory 1204 may include an operating system 1205, one or more applications 1206, and may include a program data 1207. In one embodiment, applications 1206 may include an organization application 1220. However, embodiments of the invention may be practiced in conjunction with a calendar program, a graphics library, an operating system, or any application program, and is not limited to any particular application or system. This basic configuration is illustrated in FIG. 12 by those components within a dashed line 1208.

Computing device 1200 may have additional features or functionality. For example, computing device 1200 may also include additional data storage devices (removable and/or non-removable) such as, for example, magnetic disks, optical disks, or tape. Such additional storage is illustrated in FIG. 12 by a removable storage 1209 and a non-removable storage 1210. Computer storage media may include volatile and non-volatile, removable and non-removable media implemented in any method or technology for storage of information, such as computer readable instructions, data structures, program modules, or other data. System memory 1204, removable storage 1209, and non-removable storage 1210 are all examples of computer storage media. Computer storage media may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1200. Any such computer storage media may be part of computing device 1200. Computing device 1200 may also have input device(s) 1212 such as keyboard, mouse, pen, voice input device, touch input device, etc. Output device(s) 1214 such as a display, speakers, printer, etc. may also be included. The aforementioned devices are exemplary and others may be used.

Computing device 1200 may also contain a communication connection(s) 1216 that may allow computing device 1200 to communicate with other computing devices 1218, such as over a network in a distributed computing environment, for example, an intranet or the Internet. Communication connection(s) 1216 is one example of communication media. Communication media may typically be embodied by computer readable instructions, data structures, program modules, or other data in a modulated data signal, such as a carrier wave or other transport mechanism, and includes any information delivery media. The term computer readable media as used herein may include both storage media and communication media.

A number of program modules and data files may be stored in system memory 1204 of computing device 1200, including an operating system 1205 suitable for controlling the operation of a mobile device. System memory 1204 may also store one or more program modules, such as organization application 1220, address application 1222 and others described below. While executing on processing unit 1202 or other computing devices 1218, organization application 1220 may perform processes including, for example, one or more of the stages of the methods described above. The aforementioned process is exemplary, and processing unit 1202 or other computing devices 1218 may perform other processes. Other applications 1206 that may be used in accordance with embodiments of the present invention may include calendaring applications, mapping applications, route guidance applications, etc.

Figure 13:
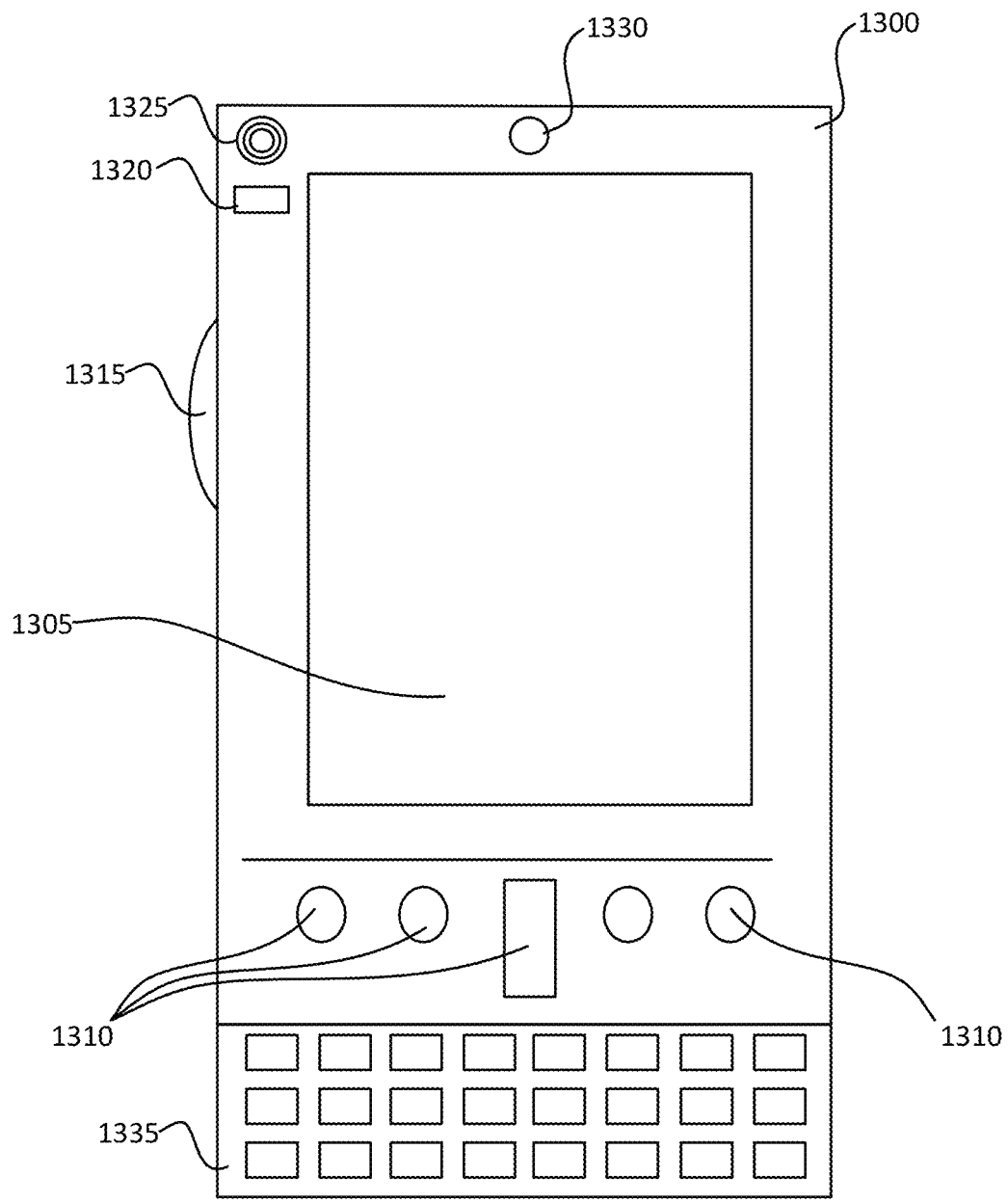
FIG. 13 is a simplified diagram of a mobile computing device.

FIG. 13 illustrates a mobile computing device 1300, for example, a smart phone, wearable computer (such as a smart watch), a tablet computer, a laptop computer, and the like, with which embodiments of the disclosure may be practiced. With reference to FIG. 13, one aspect of a mobile computing device 1300 for implementing the aspects is illustrated. In a basic configuration, the mobile computing device 1300 is a handheld computer having both input elements and output elements. The mobile computing device 1300 typically includes a display 1305 and one or more input buttons 1310 that allow the user to enter information into the mobile computing device 1300. The display 1305 of the mobile computing device 1300 may also function as an input device (e.g., a touch screen display). If included, an optional side input element 1315 allows further user input. The side input element 1315 may be a rotary switch, a button, or any other type of manual input element. In alternative aspects, mobile computing device 1300 may incorporate more or less input elements. For example, the display 1305 may not be a touch screen in some embodiments. In yet another alternative embodiment, the mobile computing device 1300 is a portable phone system, such as a cellular phone. The mobile computing device 1300 may also include an optional keypad 1335. Optional keypad 1335 may be a physical keypad or a "soft" keypad generated on the touch screen display. In various embodiments, the output elements include the display 1305 for showing a graphical user interface (GUI), a visual indicator 1320 (e.g., a light emitting diode), and/or an audio transducer 1325 (e.g., a speaker). In an aspect, the mobile computing device 1300 incorporates input and/or output ports, such as an audio input (e.g., a microphone jack), an audio output (e.g., a headphone jack), and a video output (e.g., a HDMI port) for sending signals to or receiving signals from an external device.

As should be appreciated, FIG. 13 is described for purposes of illustrating the present methods and systems and is not intended to limit the disclosure to a particular sequence of steps or a particular combination of hardware or software components.

FIG. 14 illustrates an exemplary tablet-computing device 1400 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A method for sorting and delivering postal items, the method comprising:
receiving at a mobile device, at least one input comprising an image of a mail sorting area, wherein the mail sorting area comprises multiple spaces, each space associated with a single address;
overlaying a grid onto the image of the mail sorting area, wherein the grid comprises a plurality of cells, with each of the cells having a location defined by a set of coordinates, and wherein each of the cells correspond to at least one of the multiple spaces of the mail sorting area;
automatically associating the single address of each space with the set of coordinates;
receiving an image of an address associated with a piece of mail;
performing optical recognition on a portion of the piece of mail to determine a routing and/or destination of the piece of mail;
determining if a special instruction is associated with the address, and if the address is associated with the special instruction, generating a first notification to be displayed on a graphical user interface (GUI) displayable on a mobile device;
displaying on the GUI, using the set of coordinates, a location in the mail sorting area that is associated with the piece of mail, and displaying, on the GUI, a street view of an actual address location;
generating a postal route for a carrier user, the postal route comprising each of a plurality of the single addresses, the route being based at least on the routing and/or destination of each piece of mail and associated with a plurality of the locations in the mail sorting area;
obtaining a location of the carrier user along the postal route, wherein the location of the user along the postal route is rendered on a GUI of the mobile device; and
generating a second notification on the user interface when the carrier user is physically located at the address having the special instruction, wherein the special instruction is selected from a mail hold, a mail forward, and a package delivery.

2. The method of claim 1, wherein receiving the address comprising scanning the piece of mail using IMB codes or optical character recognition (OCR).

3. The method of claim 1, wherein the piece of mail is a letter, a magazine, or a catalog, and wherein the mail sorting area is a case comprising multiple compartments, wherein each space is a compartment.

4. The method of claim 1, wherein the piece of mail is a small package, and wherein the mail sorting area is at least one basket.

5. The method of claim 1, wherein the piece of mail is a large package, and wherein the mail sorting area is a large area on a floor.

6. The method of claim 1, wherein indicating which set of coordinates is associated with the address further includes providing an auditory notification of the set of coordinates.

7. The method of claim 1, wherein when the user arrives at each address along the postal route, a street view of the address and a view of the mail sorting area with the set of coordinates being highlighted, is provided.

8. A system for sorting and delivering postal items comprising:
a computing system including at least one processor and a memory communicatively coupled to the at least one processor, the memory encoding instructions that, when executed by the processor, cause the at least one processor to:
receive at a mobile device, at least one input comprising an image of a mail sorting area, wherein the mail sorting area comprises multiple spaces, each space associated with a single address;
overlay a grid onto the image of the mail sorting area, wherein the grid comprises a plurality of cells, with each of the cells having a location defined by a set of coordinates, and wherein each of the cells correspond to at least one of the multiple spaces of the mail sorting area;
associate the single address of each space with the set of coordinates;
receive an image of an address associated with a piece of mail;

perform optical recognition on a portion of the piece of mail to determine a routing and/or destination of the piece of mail;

determine if a special instruction is associated with the address, the special instruction selected from a mail hold, a mail forward, and a package delivery;

generate a first notification to be displayed on a graphical user interface (GUI) displayable on a mobile device if the address is associated with the special instruction;

display on the GUI, a location in the mail sorting area that is associated with the piece of mail, using the set of coordinates, and displaying, on the GUI, a street view of an actual address location;

generate a postal route for a carrier user, the postal route comprising each of a plurality of the single addresses, the route being based at least on the routing and/or destination of each piece of mail and associated with a plurality of the locations in the mail sorting area;

obtain a location of the carrier user along the postal route, wherein the location of the user along the postal route is rendered on a GUI of the mobile device; and generate a second notification on the user interface when the carrier user is physically located at the address having the special instruction.

9. The system of claim 8, wherein receiving the address comprising scanning the piece of mail using IMB codes or optical character recognition (OCR).

10. The system of claim 8, wherein the piece of mail is a letter, magazine, or catalog, and wherein the mail sorting area is a case comprising multiple compartments, wherein each space is a compartment.

11. The system of claim 8, wherein the piece of mail is a small package, and wherein the mail sorting area is at least one basket.

12. The system of claim 8, wherein the piece of mail is a large package, and wherein the mail sorting area is a large area on a floor.

13. The system of claim 8, wherein indicating which set of coordinates is associated with the address further includes providing an auditory notification of the set of coordinates.

14. The system of claim 8, wherein at each address along the postal route, a street view of the address and a view of the mail sorting area with the set of coordinates being highlighted, is provided.

15. The method of claim 1, wherein when the second notification is that a package is to be delivered, the user interface displays where the package was located in the mail sorting area.

16. The system of claim 8, wherein when the second notification is that a package is to be delivered, the user interface displays where the package was located in the mail sorting area.

* * * * *